United States Patent [19]

Kravitz et al.

[11] Patent Number: 4,495,520
[45] Date of Patent: Jan. 22, 1985

[54] TELEVISION CAMERA VIDEO LEVEL CONTROL SYSTEM

[75] Inventors: Marvin Kravitz, Princeton Junction; Larry A. Freedman, East Brunswick; Elmer H. Fredd, Yardville; Dan E. Denef, Freehold, all of N.J.

[73] Assignee: The United States of America as represented by the Administrator of the National Aeronautics and Space Administration, Washington, D.C.

[21] Appl. No.: 367,132

[22] Filed: Apr. 9, 1982

[51] Int. Cl.³ .............................................. H04N 5/14
[52] U.S. Cl. .................................... 358/219; 358/217; 358/174; 358/161
[58] Field of Search ............... 358/218, 219, 223, 217, 358/228, 166, 161, 174

[56] References Cited

U.S. PATENT DOCUMENTS 3,691,302 9/1972 Gaebele et al. ...................... 358/228
4,050,085 9/1977 Prince et al. ........................ 358/218

Primary Examiner—Michael A. Masinick
Attorney, Agent, or Firm—Marvin F. Matthews; John R. Manning

[57] ABSTRACT

A video level control system 10 is provided which generates a normalized video signal for a camera processing circuit. The video level control system 10 includes a lens iris 12 which provides a controlled light signal to a camera tube 14. The camera tube 14 converts the light signal provided by the lens iris 12 into electrical signals. A feedback circuit 22 in response to the electrical signals generated by the camera tube 14, provides feedback signals to the lens iris 12 and the camera tube. This assures that a normalized video signal is provided in a first illumination range. An automatic gain control loop 50, which is also responsive to the electrical signals generated by the camera tube 14, operates in tandem with the feedback circuit 22. This assures that the normalized video signal is maintained in a second illumination range.

2 Claims, 3 Drawing Figures

TELEVISION CAMERA VIDEO LEVEL CONTROL SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 STAT. 435; U.S.C. 2457).

TECHNICAL FIELD

The invention relates in general to a television camera video level control system and more particularly to a system which utilizes automatic light and gain control circuits operated in tandem to extend the automatic dynamic light range of the camera.

Closed circuit television cameras are a vital part of the space shuttle program. The nature of the shuttle's travels results in constantly changing environmental conditions. Of course these changing conditions affect the camera's operation. That is, these changing conditions result in constantly changing lighting conditions as the shuttle travels on its designated path. It is desirable to provide a camera system that can readily adjust to such constantly changing conditions and provide reliable video signals to guarantee the integrity of the output.

Such a system of course must be capable of functioning with or without a skilled operator as well as require little adjustment by the crewman or ground control.

BACKGROUND ART

In the camera system employed in the space shuttle it is necessary to employ cameras which are sensitive enough to function under the conditions for which the shuttle is designed. Accordingly camera tubes are utilized that have very good low light level characteristics. Such systems must function over light ranges that are not ordinarily required. Video level control circuitry is required which will allow the camera tube to provide a normalized video signal over the desired range. Several known video signal level control systems combine lens iris control and gain circuits to control the camera tube and thereby provide the video signal desired. However these prior level control systems do not provide the necessary level control to insure optimum operation in the input light ranges that are desired in the camera applications required in the space shuttle program, particularly as required in the presence of an overload producing scene area.

DISCLOSURE OF THE INVENTION

The invention relates to a video level control system for providing a normalized video signal representing a scene. Electronic circuitry is provided to selectively reject scene highlights before establishing the gain of the video chain. By rejecting a pre-selected area of the scene, the system is able to maintain the camera in normal operation even under conditions of intense specular reflection. Thus optimized operation is maintained under conditions of unwanted highlights that could otherwise completely wash out the picture. A significant improvement concerns the method of setting the camera signal white level. The area of the scanned camera tube raster pattern from which the signal level exceeds the desired white level setting is the controlled variable. Three settings are incorporated which represent different percentages of the total raster pattern area. The system sets the video white level to that level established by the selected area setting and then normalizes the video signal by adjusting the gain of the remaining video of interest to achieve a maximum signal to noise output. Scene areas of brightness exceeding the reference level will be clipped (limited to maximum white level). It is the function of the automatic light and automatic gain control circuits to normalize the video signal by maintaining the selected percentage area of the scanned raster pattern at the video white level and by adjusting the gain of the balance of the video for optimum signal to noise ratio. Selection of the area percentages is accomplished by switching resistances at the input to the integrator in both the automatic light and automatic gain control circuits. The video control system includes a first means for imaging the scene and controlling the intensity of the light from the scene. A second means which is responsive to the first means is provided for converting light images of the scene into electrical signals. The video control system also includes a third means which is responsive to the amplitude of the video signal for a first illlumination range and which serves to maintain a substantially constant video signal for said first illumination range. Additionally, a fourth means is provided which is responsive to the amplitude of the video signal above a threshold level and serves to control the first and second means to provide a substantially constant video signal above said first illumination range.

BRIEF DESCRIPTION OF THE DRAWING

The details of the invention will be described in connection with the accompanying drawing in which.

BEST MODE FOR CARRYING OUT THE INVENTION

Figure 1:
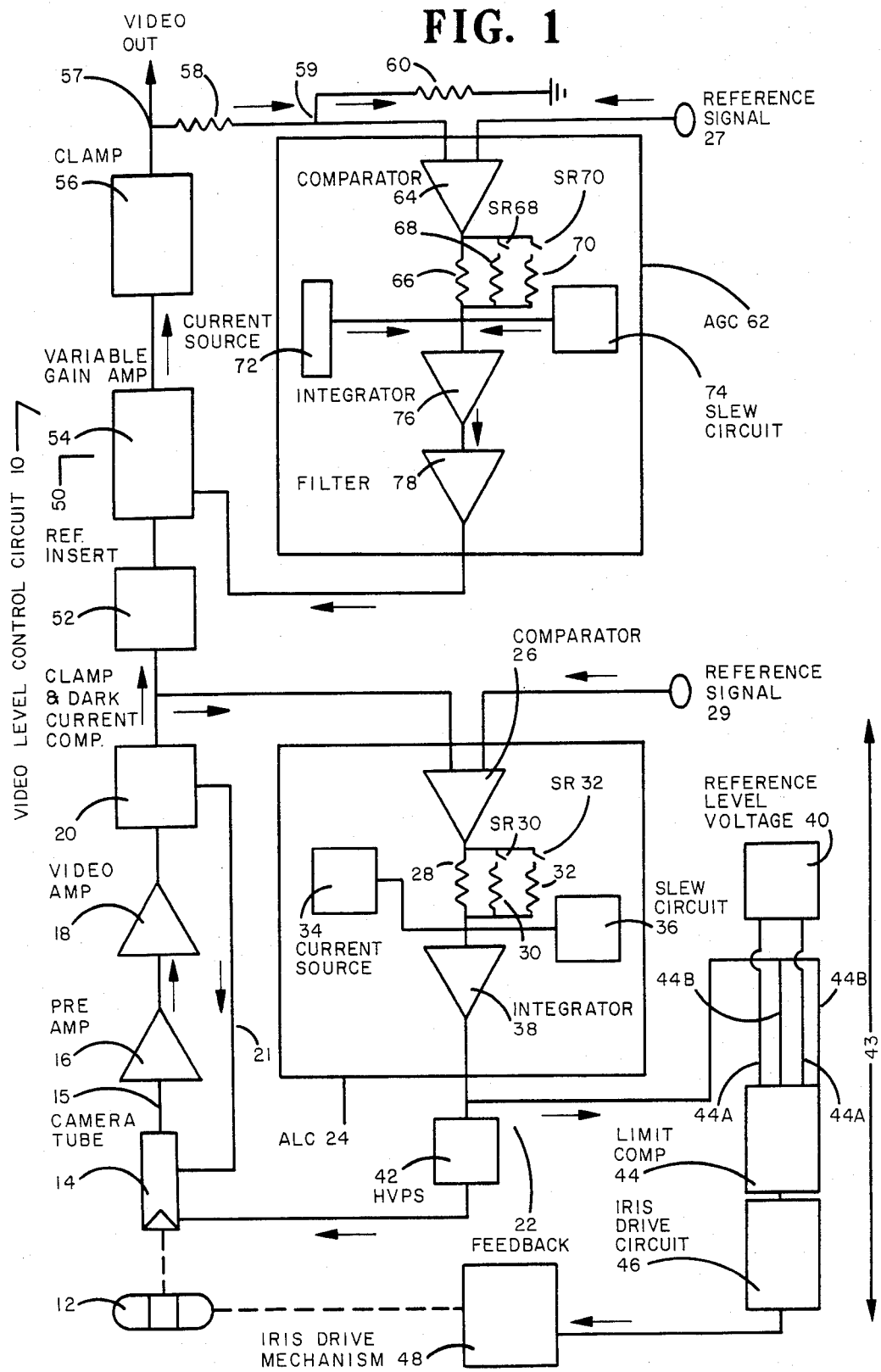
FIG. 1 is a block schematic diagram of a video signal level control system in accordance with the invention.

Referring to FIG. 1, a video level control circuit 10 is provided for maintaining and providing a normalized video signal to video processing circuits in a camera (not shown). A lens containing an iris 12 is provided, said iris having a variable size aperture, and/or other means of light control, through which light can pass. The iris 12 will open or constrict in response to ambient illumination to thereby control illumination in desired ranges. The lens iris 12 passes light to a camera tube 14. The camera tube 14 may be, for example, a silicon intensifier-target tube. The silicon intensifier-target tube is a low-light level device that is suitable for the applications needed in the Space Shuttle TV Camera. The camera tube 14 receives light at its input via the lens and the iris 12, which represents the image of a desired scene and converts the image focused on its face into electrical signals representative of that image. The camera tube 14 is coupled at the output thereof to a preamplifier 16. The preamplifier 16 is a fixed gain low noise amplifier which translates the camera tube output current to an amplified voltage signal and couples the signal to a fixed gain amplifier 18. The amplifier 18 serves to further increase the output signal of the camera tube 14 to permit the establishment of a dc reference by a clamp and dark current comparator circuit 20. This dc reference is further adjusted in response to changing dark current in camera tube 14, by information fed via line 21 to the clamp and dark current comparator circuit 20.

The clamped video signal is fed from the clamp circuit 20 to a feedback loop or circuit 22 which includes an automatic light control circuit 24. The automatic light control circuit 24 includes a comparator 26. One input of the comparator 26 is coupled to the output of the clamp circuit 20. The other input of the comparator 26 is coupled to a reference signal 29. The output of the comparator 26 is coupled to resistor 28 and to resistors 30 and 32 through switches SR30 and SR32 respectively. The resistors 28, 30 and 32 are coupled from the comparator 26 to an integrator 38 forming a part of the automatic light control circuit 24. The particular resistor selected establishes the area of the scene that exceeds the peak white level, and is clipped. The balance of the scene then is normalized between the voltages corresponding to black and peak white. A current source 34 and a pair of slew circuits 36 are also coupled to the integrator 38 at its input.

The automatic light control circuit 24 is coupled from the output of the integrator 38 to a high voltage power supply 42 forming a part of the feedback circuit 22. The high voltage power supply 42 is coupled at its output to the camera tube 14 and is controlled by the automatic control circuit 24 to vary the gain of the camera tube 14.

A reference level voltage source 40 is provided and is coupled into an iris control loop 43. The iris control loop 43 includes a limit comparator 44 having two pairs of inputs 44a and 44b respectively. The pair of inputs 44a of the limit comparator 44 are coupled to the reference level voltage source 40 and the other pair of inputs 44b are coupled to the output of the automatic light control circuit 24. The output of the limit comparator 44 is coupled to an iris drive circuit 46. The iris drive circuit 46 can be formed, for example, of well known logic blocks, including integrated circuitry which is sufficient to provide the needed control signals to drive the lens iris 12. The iris drive circuit 46 is coupled to an iris drive mechanism 48. The iris drive mechanism 48 may be a motor or other suitable means, preferably which operates on low power as may be provided by integrated circuits. The iris drive mechanism is coupled to the lens iris 12 to control movement of the aperture of the iris.

Additionally the output of the clamp circuit 20 of the video level control circuit 10 is also coupled to an automatic gain control loop 62. The automatic gain control loop 62 includes a reference insertion circuit 52 which provides reference insertion during blanking intervals. The reference insertion circuit 52 is coupled to an amplifier 54. The output of the amplifier 54 is coupled to a clamp circuit 56 which restores the DC component of the video signal thereby providing a signal to the output node 57, designated as video out. A voltage divider formed of resistors 58 and 60 is coupled between the output node 57 and ground.

An automatic gain control circuit 62 is provided between the output node 57 and the amplifier 54. The gain control circuit 62 includes a comparator 64. One input of the comparator 64 is coupled to a node 59 between the resistor 58 and 60. The other input of the comparator 64 is coupled to the reference signal 27. The output of the comparator 64 is coupled to resistor 66 and resistors 68 and 70 through switches SR68 and SR70 respectively. The resistors 66, 68 and 70 are coupled from the comparator 64 to an integrator 76. These resistors together with the integrator again function to establish the area of the scene that exceeds peak white, and the gain of the remaining video signal is then normalized. A current source 72 and slew circuit 74 are coupled to the input of the integrator 76. The automatic gain control loop 62 also includes a loop filter 78 which faciliatates control of the gain of the amplifier 54.

As is illustrated in FIG. 1 the video level control circuit 10 is provided with automatic light control and automatic gain control functions. These operate in tandem to provide a normalized video signal to video processor circuits (not shown) in the camera. The video level control circuit 10 operates in an automatic or manual mode. During operation of the video level control circuit 10, a normalized video signal such as, for example, one volt peak-to-peak is maintained by the automatic light control circuit 24 at the output of the clamp circuit 20. In the automatic mode the action of the automatic light control circuit 24 is to maintain the high voltage between two limits, for example, 3.5 kilovolts and 4.5 kilovolts, by controlling the lens iris 12. These voltage limits are controlled by the limit comparator 44 and the iris drive circuit 46.

When there is no scene, that is, when the lens (not shown) is covered, the output voltage of the integrator 38, due to the current source 34, will rise thereby producing maximum high voltage and maximum gain in the camera tube 14. When there is a scene, that is, when the lens is uncapped and illumination increases, a pulse signal appears at the output of the comparator 26. The pulse signal's duration is a function of the video amplitude exceeding the one volt comparison voltage. This signal is integrated by the integrator 38. The resulting integrated signal controls both the high voltage power supply 42 and the lens iris 12 through limit comparator 44, the iris drive circuit 46 and the iris drive mechanism 48.

The limit comparator 44 has a dead zone, such as, for example, 2.6 volts to 3.3 volts, which represents a range of about 25 increments of movement of the iris drive mechanism 48. It is the function of the changing high voltage from the high voltage power supply 42 to maintain the normalized one-volt peak-to-peak signal by varying the camera tube 14 gain over a range such as, for example, five to one within this dead zone.

One of three area modes is selected by switching resistor 28, 30, or 32 at the input of the integrator 38. The pair of slew circuits 36 which are coupled to the input of the integrator 38 are activated whenever large changes in illumination are encountered. Each slew circuit 36 operates in one direction only to reduce transition times.

The automatic gain control circuit 62 is similar in operation to the automatic light control circuit 24. However it operates in another illumination range. A normalized video amplitude such as, for example, three volts peak-to-peak is maintained by the automatic gain control circuit 62 at the output of the clamp circuit 56. The current source 72, comparator 64 and slew circuit 74 operate the same as those same elements in the automatic light control circuit 24. The filter 78 coupled to the output of the integrator 76 drives the gain control elements of the amplifier 54. The gain of the amplifier 54 varies, for example, from thirty to three to maintain a normalized video signal of three volts peak-to-peak. Once the normalized automatic light control signal at the output of the amplifier 18 attains one volt peak-to-peak, the gain of the amplifier 54 remains constant, for example, at about a value of three. One slew circuit 74 is used in the automatic gain control circuit to reduce the transition time for large increases in illumination.

In the manual mode the aperture of the lens iris 12 is stationary. The required light range is attained by controlling the high voltage of the high voltage power supply 42 over a greater range and by utilization of the automatic gain control circuit 62.

Figure 2:
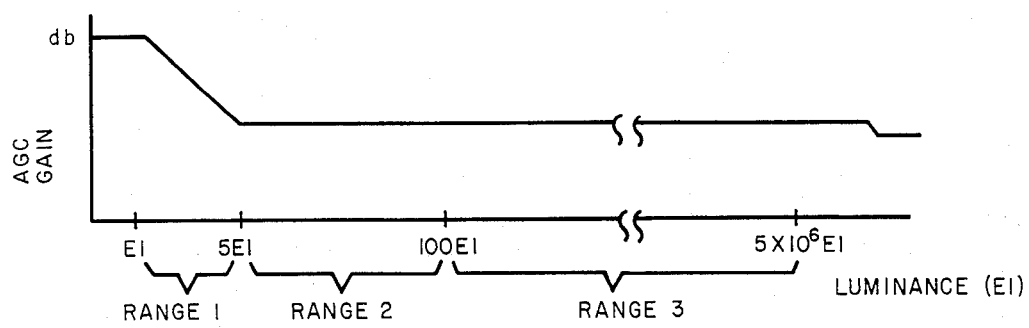
FIG. 2 is a graph illustrating the change in voltage and gain with increased illumination and the change in iris transmission with increased illumination during the automatic mode of a preferred embodiment of the invention.
Figure 2:
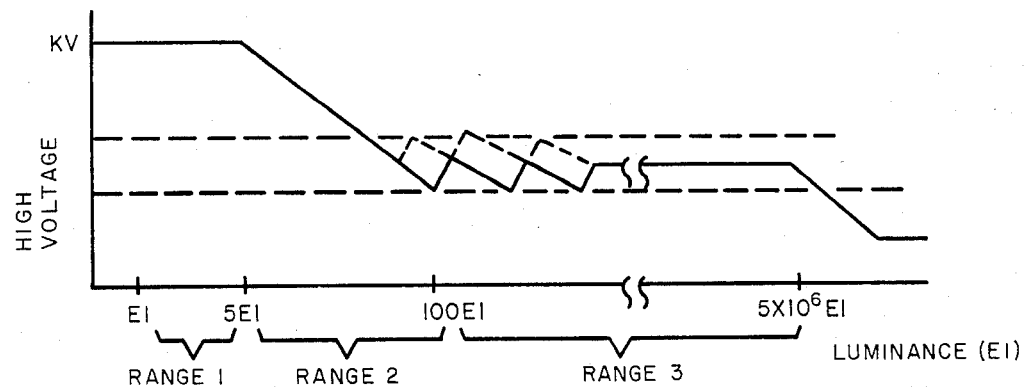
Figure 2:
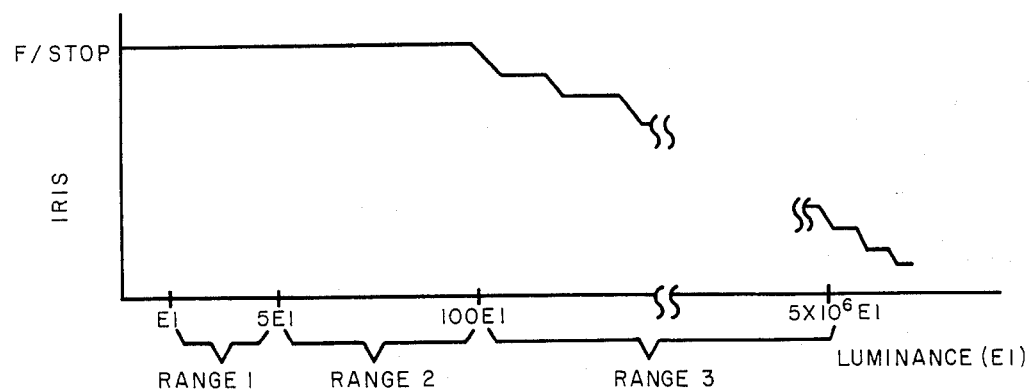

The relationship between the gain of the amplifier 54 in the automatic gain control loop 50 the high voltage of the high voltage power supply 42, and the opening and closing of the aperture of the lens iris 12 and luminance is shown in FIG. 2. FIG. 2 includes three curves. The first curve represents the gain of the amplifier 50 versus luminance. The second curve represents the output voltage of the high voltage power supply 42 versus luminance. The third curve represents the diameter (f stop) of the lens iris 12 versus luminance.

The automatic mode of the video level control circuit 10 must accommodate a light range of $5 \times 10^6$ to 1. The automatic light control circuit 24 will maintain the camera tube 14 at a desired level by controlling the lens iris 12 and high voltage power supply 42. In the automatic mode the lens iris 12 and high voltage power supply 42 provides a light range of $1 \times 10^6$ to 1. The additional 5 to 1 range is provided by the automatic gain control circuit 62. As illustrated in FIG. 2, in range 1, the gain of the amplifier 54 decreases as the aperture of the lens iris 12 and the voltage of the high voltage power supply 42 are held constant. In range 2, the gain of the amplifier 54 and the aperture of the lens iris 12 are held constant and the voltage of the high voltage power supply 42 decreases. In range 3, the gain of the amplifier 54 is held constant and the voltage of the high voltage, power supply 42 is held between 2 narrow limits (dashed lines on the figure) as the size of aperture of the lens iris 12 decreases. As a result of the operating characteristics of these circuit components the desired light range can be readily achieved during the automatic mode of operation of the video level control circuit 10.

The manual mode of operation of the video level control circuit must accommodate a 2000 to 1 input light range. In the manual mode the aperture of the lens iris 12 is held stationary. The required light range is attained by controlling the high voltage of the high voltage power supply 42 over a greater range. The remaining range is provided by the automatic gain control circuit 62.

Figure 3:
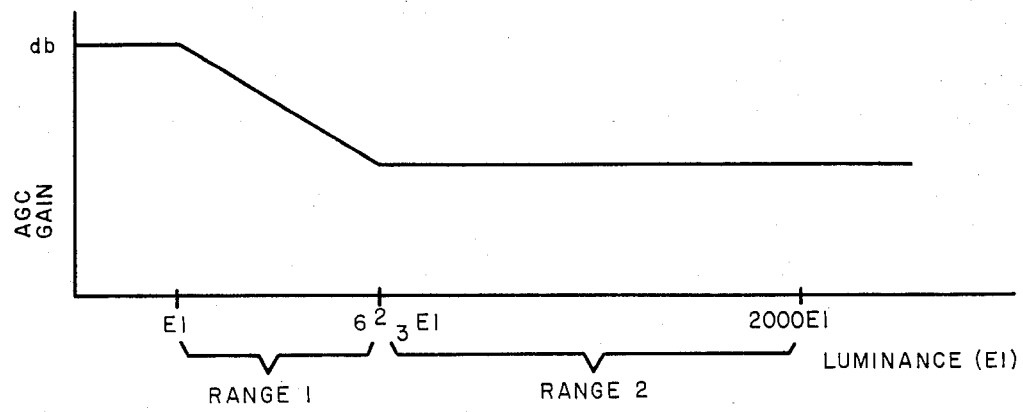
FIG. 3 is a graph illustrating the change in voltage and gain with increased illumination during a manual mode of a preferred embodiment of the invention.
Figure 3:
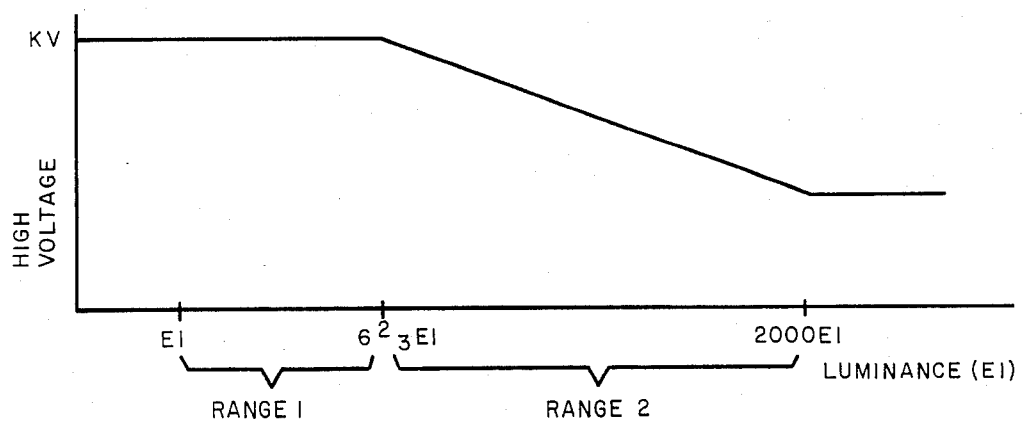

The relationship between the high voltage of the high voltage power supply 42 and the gain of the amplifier 54 in the manual mode is shown in FIG. 3. FIG. 3 includes two curves. The first curve represents the gain of the amplifier 54 versus luminance. The second curve represents the voltage of the high voltage power supply 42 versus luminance. The high voltage is controlled over a range providing a 300 to 1 input variation while the automatic gain control circuit provides the remaining range of $6\frac{2}{3}$ to 1. As illustrated in FIG. 3, in range 1, the gain of the amplifier 54 decreases as the voltage of the high voltage power supply 42 is held constant. In range 2 the gain of the amplifier 54 is held constant while the voltage of the high voltage power supply 42 decreases. These operating characteristics guarantee that the desired light ranges are achieved when the video level control circuit 10 is operated in the manual mode.

It should be understood that the selection of the rate of change of gain, voltage and aperture shown in FIGS. 2 and 3 are examples only and that numerous other values may be employed in accordance with the invention.

It is to be further understood that the above described arrangements are illustrative and that other arrangements may be described by those skilled in the art without departing from the spirit and scope of the invention.

What is claimed is:

1. A video level control system for providing a normalized video signal representing a scene including:
   first means for providing light images of a scene and controlling the intensity of admitted light from the scene;
   second means including a camera tube responsive to the light images provided by the first means for converting the light images of a scene into electrical signals, and for conditioning the electrical signals;
   third means responsive to the electrical signals provided by the second means for providing a normalized video signal by altering the electrical signals of the second means through automatic gain control as a function of the signal remaining after clipping a pre-selected area percentage of the scene that exceeds a pre-set reference when scene luminance is in a first illumination range; and
   fourth means for controlling the first and second means so that a normalized video signal is provided when scene luminance is above the first illumination range.

2. A video level control system in accordance with claim 1 wherein the fourth means includes:
   means responsive to the electrical signals provided by second means for generating a normalized control signal by automatic light control as a function of the electrical signal remaining after clipping a pre-selected area percentage of the scene that exceeds a pre-set reference;
   high voltage means responsive to the normalized control signal for controlling the gain of the camera tube of the second means;
   iris control means responsive to the normalized control signal for controlling the intensity of light admitted throught first means.

* * * * *